US012610437B2

(12) United States Patent
Yang

(10) Patent No.: US 12,610,437 B2
(45) Date of Patent: Apr. 21, 2026

(54) BIDIRECTIONAL COLORFUL LIGHT TRIGGERED BY POWER-LINE PULSE SIGNALS CONNECTED IN SERIES AND PARALLEL

(71) Applicant: HANGZHOU YUN LED CHIP PHOTOELECTRICITY TECH. CO., LTD., Hangzhou (CN)

(72) Inventor: Yinghan Yang, Hangzhou (CN)

(73) Assignee: HANGZHOU YUN LED CHIP PHOTOELECTRICITY TECH. CO., LTD., Hangzhou (CN)

( * ) Notice: Subject to any disclaimer, the term of this patent is extended or adjusted under 35 U.S.C. 154(b) by 36 days.

(21) Appl. No.: 18/961,040

(22) Filed: Nov. 26, 2024

(65) Prior Publication Data

US 2025/0089135 A1 Mar. 13, 2025

Related U.S. Application Data

(63) Continuation of application No. PCT/CN2023/091083, filed on Apr. 27, 2023.

(30) Foreign Application Priority Data

May 30, 2022 (CN) ........................ 202210601329.8

(51) Int. Cl.
*H05B 45/20* (2020.01)
*H05B 45/325* (2020.01)
(Continued)

(52) U.S. Cl.
CPC ........... *H05B 45/20* (2020.01); *H05B 45/325* (2020.01); *H05B 45/3725* (2020.01); *H05B 47/155* (2020.01); *H05B 47/165* (2020.01)

(58) Field of Classification Search
CPC ...... H05B 45/10; H05B 45/37; H05B 39/044; H05B 47/10; H05B 45/14; H05B 45/20
See application file for complete search history.

(56) References Cited

U.S. PATENT DOCUMENTS 8,022,634 B2 * 9/2011 Greenfeld .............. H05B 45/46
315/192
9,967,938 B2 * 5/2018 Chen ...................... H05B 45/10
(Continued)

*Primary Examiner* — Wei (Victor) Y Chan
(74) *Attorney, Agent, or Firm* — Syncoda LLC; Feng Ma

(57) ABSTRACT

A bidirectional colorful light triggered by power-line pulse signals connected in series and parallel includes a bidirectional luminous light string triggered by power-line pulse signals, a first controllable switch, a second controllable switch, a third controllable switch, and a fourth controllable switch. The bidirectional luminous light string triggered by power-line pulse signals comprises a plurality of bidirectional light sources, which comprises a light module triggered by power-line pulse signals and a reverse light module. The light module triggered by power-line pulse signals comprises an LED colorful light group and an LED driver that drives the LED colorful light group based on power-line pulse signals loaded on power lines of the bidirectional luminous light string triggered by power-line pulse signals. This invention achieves a bidirectional colorful light driven by power-line pulse signals through the control of the second and fourth controllable switches, simplifying the control circuit.

16 Claims, 3 Drawing Sheets

(51) Int. Cl.

*H05B 45/3725* (2020.01)
*H05B 47/155* (2020.01)
*H05B 47/165* (2020.01)

(56) References Cited

U.S. PATENT DOCUMENTS

| | | | | |
|---|---|---|---|---|
| 11,076,466 | B2 * | 7/2021 | Wu | H05B 45/10 |
| 2014/0361697 | A1 * | 12/2014 | Miskin | H05B 45/46 315/192 |
| 2016/0227616 | A1 * | 8/2016 | Lee | H05B 47/105 |

* cited by examiner

BIDIRECTIONAL COLORFUL LIGHT TRIGGERED BY POWER-LINE PULSE SIGNALS CONNECTED IN SERIES AND PARALLEL

CROSS-REFERENCE TO RELATED APPLICATIONS

The present application is a continuation of International Patent Application No. PCT/CN2023/091083 filed on Apr. 27, 2023, which claims priority to Chinese Patent Application No. CN 202210601329.8 filed on May 30, 2022. The disclosures of the above-referenced applications are hereby incorporated by reference in their entirety.

BACKGROUND

The present invention relates to the field of LED colorful lights, specifically to a bidirectional colorful light triggered by power-line pulse signals connected in series and parallel.

Currently, the market has seen developments such as the "Arithmetic Operation Device and LED Driver Triggered by Power Line Edge Signals" and the Chinese invention patents "Colorful Light Device Controlled by Power Line Edge Signals" (Chinese Invention Patent ZL201410632645.7, Chinese Invention Patent ZL201410775449.5). Due to their high cost-effectiveness, these patented technologies have enabled large-scale industrial applications.

The Chinese invention patent "Bidirectional Light-emitting Light Source Triggered by Power-Line Pulse Signals, Light String, and Control Device" (Publication No. CN114364096A) discloses a bidirectional light-emitting light source triggered by power-line pulse signals, which comprises a bidirectional light-emitting light string triggered by power-line pulse signals, a first controllable switch, a second controllable switch, a third controllable switch, and a fourth controllable switch. In the patent, FIG. 8 and the implementation examples further disclose a controllable switch module suitable for series and parallel configurations, achieving over 5V voltage control through NMOS in the controllable switch module.

The implementation of over 5V voltage control through additional NMOS requires the control of four sets of controllable switches. This not only necessitates extra NMOS devices but also increases the number of control ports for the corresponding controller circuit, thereby adding complexity to the circuit design.

SUMMARY

The objective of the present invention is to provide a bidirectional colorful light that triggers operations based on power-line pulse signals in series and parallel. It requires the control of only two sets of controllable switches to manage four sets of controllable switches, allowing for the expansion of the light source's spectral range by permitting both forward and reverse currents, and achieving color control by loading pulse signals onto the power line.

A bidirectional colorful light triggered by power-line pulse signals connected in series and parallel, comprises:

a bidirectional luminous light string triggered by power-line pulse signals, a first controllable switch, a second controllable switch, a third controllable switch, and a fourth controllable switch;

the bidirectional luminous light string triggered by power-line pulse signals comprises a plurality of bidirectional light sources, which are connected in parallel, or connected first in parallel and then in series, or connected first in series and then in parallel between the first port and the second port of the bidirectional luminous light string triggered by power-line pulse signals;

the bidirectional light source comprises a light module triggered by power-line pulse signals and a reverse light module, with the light module triggered by power-line pulse signals and the reverse light module connected in parallel at the first port and the second port of the bidirectional light source;

the light module triggered by power-line pulse signals comprises an LED colorful light group and an LED driver that drives the LED colorful light group based on power-line pulse signals loaded on power lines;

when the voltage level at the first port of the bidirectional luminous light string triggered by power-line pulse signals is higher than that at the second port, the voltage level at the first port of the bidirectional light source is also higher than that at the second port of the bidirectional light source, and the LED driver drives the LED colorful light group based on the power-line pulse signals loaded on the power lines; when the voltage level at the first port of the bidirectional luminous light string triggered by power-line pulse signals is lower than that at the second port, the voltage level at the first port of the bidirectional light source is lower than that at the second port of the bidirectional light source, and the reverse light module operates;

the second controllable switch and the fourth controllable switch are controlled by a control circuit;

the input terminal of the first controllable switch is connected to a DC power supply, the output terminal of the first controllable switch is connected to the first port of the bidirectional luminous light string triggered by power-line pulse signals, and the control terminal of the first controllable switch is connected to the output terminal of a first voltage divider module; the first voltage divider module comprises a first voltage divider resistor and a second voltage divider resistor, with one end of the first voltage divider resistor connected to the input terminal of the first controllable switch, the other end serving as the output of the first voltage divider module and connected to one end of the second voltage divider resistor, and the other end of the second voltage divider resistor connected to the output terminal of the fourth controllable switch;

the output terminal of the second controllable switch is connected to the first port of the bidirectional luminous light string triggered by power-line pulse signals, the input terminal of the second controllable switch is connected to ground, and the control terminal of the second controllable switch is connected to the control circuit;

the input terminal of the third controllable switch is connected to the DC power supply, the output terminal of the third controllable switch is connected to the second port of the bidirectional luminous light string triggered by power-line pulse signals, and the control terminal of the third controllable switch is connected to the output terminal of a third voltage divider module; the third voltage divider module comprises a third voltage divider resistor and a fourth voltage divider resistor, with one end of the third voltage divider resistor connected to the input terminal of the third controllable switch, the other end serving as the output of the third voltage divider module and connected to one end of the fourth voltage divider resistor, and the other end of the fourth voltage divider resistor connected to the output terminal of the second controllable switch;

the output terminal of the fourth controllable switch is connected to the second port of the bidirectional luminous light string triggered by power-line pulse signals, the input terminal of the fourth controllable switch is connected to ground, and the control terminal of the fourth controllable switch is connected to the control circuit.

When the plurality of bidirectional light sources of the bidirectional luminous light string triggered by power-line pulse signals are connected in parallel, the first ports of the bidirectional light sources are electrically connected by wires to the first port of the bidirectional luminous light string triggered by power-line pulse signals, and the second ports of the bidirectional light sources are electrically connected by wires to the second port of the bidirectional luminous light string triggered by power-line pulse signals.

When the plurality of bidirectional light sources of the bidirectional luminous light string triggered by power-line pulse signals are connected first in series and then in parallel, a plurality of series groups are formed with a plurality of bidirectional light sources connected in series; the first port of the first bidirectional light source in a series group is electrically connected to the first port of the bidirectional luminous light string triggered by power-line pulse signals, and the second port of the previous bidirectional light source in a series group is electrically connected to the first port of the next bidirectional light source, with the second port of the last bidirectional light source in a series group electrically connected to the second port of the bidirectional luminous light string triggered by power-line pulse signals.

When the plurality of bidirectional light sources of the bidirectional luminous light string triggered by power-line pulse signals are connected first in parallel and then in series, a plurality of bidirectional light sources connected in parallel form a parallel group, and a plurality of parallel groups are connected in series; the first ports of the plurality of bidirectional light sources in the parallel group are electrically connected together to form the first common port of the parallel group, and the second ports of the plurality of bidirectional light sources in the parallel group are electrically connected together to form the second common port of the parallel group; the first common port of the first parallel group is connected to the first port of the bidirectional luminous light string triggered by power-line pulse signals, and the second common port of the previous parallel group is electrically connected to the first common port of the next parallel group, with the second common port of the last parallel group electrically connected to the second port of the bidirectional luminous light string triggered by power-line pulse signals.

Preferably, the first controllable switch is a first PMOS transistor, with the source of the first PMOS transistor serving as the input of the first controllable switch, the drain of the first PMOS transistor serving as the output of the first controllable switch, and the gate of the first PMOS transistor serving as the control terminal of the first controllable switch.

The third controllable switch is a third PMOS transistor, with the source of the third PMOS transistor serving as the input of the third controllable switch, the drain of the third PMOS transistor serving as the output of the third controllable switch, and the gate of the third PMOS transistor serving as the control terminal of the third controllable switch.

When the control circuit controls the fourth controllable switch to be off, the output level of the first voltage divider module equals the source level of the first PMOS transistor, causing the first PMOS transistor to turn off; when the control circuit controls the fourth controllable switch to be on, the output level of the first voltage divider module is less than the source level of the first PMOS transistor, causing the first PMOS transistor to turn on.

When the control circuit controls the second controllable switch to be off, the output level of the third voltage divider module equals the source level of the third PMOS transistor, causing the third PMOS transistor to turn off; when the control circuit controls the second controllable switch to be on, the output level of the third voltage divider module is less than the source level of the third PMOS transistor, causing the third PMOS transistor to turn on.

Preferably, when the control circuit sets the second controllable switch to off and the control circuit sets the fourth controllable switch to on, the LED driver drives the LED colorful light group based on the power-line pulse signals loaded on the power lines.

When the control circuit sets the fourth controllable switch to turn off and sets the second controllable switch to turn on, the reverse light module operates.

Preferably, when the control circuit sets the second controllable switch to off, while the control circuit switches the fourth controllable switch between on and off states, generating the power-line pulse signals loaded on the power lines, with the LED driver driving the LED colorful light group based on the power-line pulse signals loaded on the power lines.

As an alternative embodiment, when the control circuit controls the second controllable switch to turn off and the fourth controllable switch to turn on, the LED driver drives the LED colorful light group based on the power-line pulse signals loaded on the power line, with the power-line pulse signals being loaded by an additional circuit. The additional circuit sets the low voltage level of the power-line pulse signals to be a third level that is higher than the voltage level at the second port of the bidirectional light source and lower than the voltage level at the first port of the bidirectional light source.

The light module triggered by power-line pulse signals and the reverse light module can be packaged together, connected by soldering to other carriers, or connected by a plurality of lengths of wire.

It should be understood that the reverse light module can operate in a constant state working mode or in a controlled variable state working mode.

The LED driver comprises a reverse current blocking module, and an operation module triggered by power-line pulse signals.

When the voltage level at the first port of the bidirectional light source is higher than the voltage level at the second port, the light module triggered by power-line pulse signals drives the LED colorful light group based on the pulse signals loaded at the first port of the bidirectional light source, the second port of the bidirectional light source, or a combination of both ports.

The power-line pulse signals can be high pulse active, low pulse active, or a combination of high and low pulses. Preferably, the low level of the power-line pulse signals is equal to the level at the second port of the bidirectional light source. As an alternative embodiment, the low level of the power-line pulse signals is a third level that is higher than the level at the second port of the bidirectional light source and lower than the level at the first port.

The input end of the reverse current blocking module is connected to the first port of the bidirectional light source, and the output end of the reverse current blocking module is connected to the operation module triggered by power-line pulse signals. The ground of the operation module triggered by power-line pulse signals is connected to the second port of the bidirectional light source, and the operation module triggered by power-line pulse signals drives the LED colorful light group based on operation results.

Preferably, a pull-down resistor is connected between the output end of the reverse current blocking module and the ground of the operation module triggered by power-line pulse signals.

Preferably, the LED colorful light group can be connected in a common anode configuration, with the cathodes of the LEDs in the LED colorful light group connected to the output end of the operation module triggered by power-line pulse signals. The common anode of the LED colorful light group can be connected to the output end of the reverse current blocking module, or it can also be connected to the input end of the reverse current blocking module. As an alternative embodiment, the LED colorful light group can be connected in a common cathode configuration, with the anodes of the LEDs in the LED colorful light group connected to the output end of the operation module triggered by power-line pulse signals, and the common cathode of the LED colorful light group connected to the second port of the bidirectional light source.

Preferably, the operation module triggered by power-line pulse signals performs operations based on the power-line pulse signals, driving the LED colorful light group based on the operation results. It should be understood that the operation can be interpreted as any changes in the internal state of the operation module triggered by power-line pulse signals; furthermore, the operation can be arithmetic operations, logical operations, or a combination of arithmetic and logical operations. Preferably, the operation module triggered by power-line pulse signals performs pulse counting operations triggered by the pulse signals. As another embodiment, the operation module triggered by power-line pulse signals performs encoding and decoding operations triggered by the pulse signals, with the width of the pulse high and low levels corresponding to encoded information. It should further be understood that different lengths of high levels, different lengths of low levels, or a combination of different lengths of high and low levels represent different logical encoded information. Preferably, high pulses with a duration of less than 100 microseconds correspond to logic 0, while high pulses with a duration of 100 microseconds or more correspond to logic 1. As an alternative embodiment, the operation module triggered by power-line pulse signals performs modulation and demodulation operations based on current or voltage frequency triggered by the pulse signals, driving the LED light colorful group based on the results of the modulation and demodulation operations. Furthermore, it should be understood that the operations triggered by the pulse signals can be triggered by a single pulse signal or by a combination of a plurality of pulse signals.

Preferably, the reverse current blocking module can be a single device or a combination of multiple devices. The reverse current blocking module can be a resistor that limits the reverse current to less than 500 mA.

Preferably, the reverse current blocking module is a unidirectional conduction module, which conducts when the input end of the reverse current blocking module is at a higher voltage level than its output end, and turns off when the input end is at a lower voltage level than its output end.

Preferably, the unidirectional conduction module is a diode, with the anode of the diode connected to the first port of the bidirectional light source and the cathode connected to the operation module triggered by power-line pulse signals; or the unidirectional conduction module is an equivalent diode formed by an NPN transistor, with the collector and base of the NPN transistor connected together and then connected to the first port of the bidirectional light source, and the emitter connected to the operation module triggered by power-line pulse signals; or the unidirectional conduction module is an equivalent diode formed by a PNP transistor, with the collector and base of the PNP transistor connected together and connected to the operation module triggered by power-line pulse signals, and the emitter connected to the first port of the bidirectional light source.

Preferably, the reverse current blocking module and the operation module triggered by power-line pulse signals are integrated within a same integrated circuit. By integrating the reverse current blocking module and the operation module triggered by power-line pulse signals into the same integrated circuit, it avoids the need for additional devices to prevent reverse current damage to the operation module triggered by power-line pulse signals during packaging, reduces the complexity of packaging processes such as die bonding and wire bonding, improves packaging efficiency, decreases the likelihood of packaging errors, and lowers the cost of the LEDs.

As an alternative embodiment, the reverse current blocking module and the operation module triggered by power-line pulse signals can be completed by different independent modules.

Preferably, the reverse light module consists of a plurality of LEDs. Furthermore, the number of LEDs can be one or more than two. These LEDs can be arranged in a parallel configuration, or can be connected first in parallel and then in series, or first in series and then in parallel. Preferably, the reverse light module can be warm white in color.

As an alternative embodiment, the reverse light module is a second light module triggered by power-line pulse signals. When the voltage level at the first port of the bidirectional light source is lower than the voltage level at the second port, the second light module triggered by power-line pulse signals drives the LED colorful light group of the second light module triggered by power-line pulse signals based on the power-line pulse signals loaded onto the power lines. Preferably, the structure of the second light module triggered by power-line pulse signals is the same as that of the light module triggered by power-line pulse signals.

Preferably, the LED colorful light group of the second light module triggered by power-line pulse signals differs in color from the LED colorful light group of the light module triggered by power-line pulse signals. More preferably, the LED colorful light group of the second light module triggered by power-line pulse signals comprises warm white, golden yellow, and cool white color schemes.

Preferably, the operation module triggered by power-line pulse signals comprises:

a pulse trigger operation unit, which is triggered to do operates based on the power-line pulse signals from the power lines and outputs operation results;

a charging unit to provide power supply to the pulse trigger operation unit based on the power-line pulse signals input from the power lines, charging when the power-line pulse signals are high and discharging when the power-line pulse signals are low;

an initialization unit to initialize the pulse trigger operation unit based on the power supply from the charging unit.

In operation module triggered by power-line pulse signals of the present invention, each unit can be integrated into an operation chip.

Through initialization, the pulse trigger operation unit can be set to any arbitrary number as needed, typically set to “zero” (i.e., reset).

When the power-line pulse signals are at a high level, the charging unit charges, and when the level provided by the charging unit reaches a high level, the pulse trigger operation unit and the initialization unit are successfully powered on.

The pulse trigger operation unit can perform counting operations, arithmetic operations, logical operations, or shift operations, or combinations of these operations.

Preferably, the pulse trigger operation unit is a pulse counting unit that counts the pulse number of the power-line pulse signals input from the power lines and outputs the count results.

The pulse counting unit comprises a plurality of flip-flops that output the count results at the output of the flip-flops.

Preferably, the flip-flops are D flip-flops.

Preferably, the pulse counting unit comprises a plurality of D flip-flops connected in series to output the count results from the D flip-flops.

The clock signal of the first D flip-flop is connected to the power line, and the clock signal of each subsequent D flip-flop is connected to the inverted output of the previous D flip-flop.

The reset terminals of each D flip-flop are connected to the initialization unit, and the inverted outputs of each D flip-flop are connected to the trigger input.

It should be understood that adding resistors for current limiting between the ports of the controllable switches and their corresponding connection ports, as well as adding capacitors at the various ports of the controllable switches, is permissible.

Preferably, the second controllable switch and the fourth controllable switch are NMOS devices.

The present invention discloses a bidirectional luminous light string triggered by power-line pulse signals by controlling the second and fourth controllable switches. Compared to some implementations, the invention simplifies the control circuit and, through forward current triggered by power-line pulse signals, obtains one spectral range. By additionally using reverse current to create another spectral range, it significantly expands the spectral range of the light source, light string, and their control devices using only two power lines.

BRIEF DESCRIPTION OF DRAWINGS

To more clearly illustrate the embodiments of the disclosure, the following is a brief description of the drawings, which are for illustrative purpose only. For those of ordinary skills in the art, other drawings of other embodiments can become apparent based on these drawings.

DETAILED DESCRIPTION

In the following, with reference to the drawings of embodiments disclosed herein, the technical solutions of the embodiments of the disclosure will be described in a clear and fully understandable way.

Figure 1:
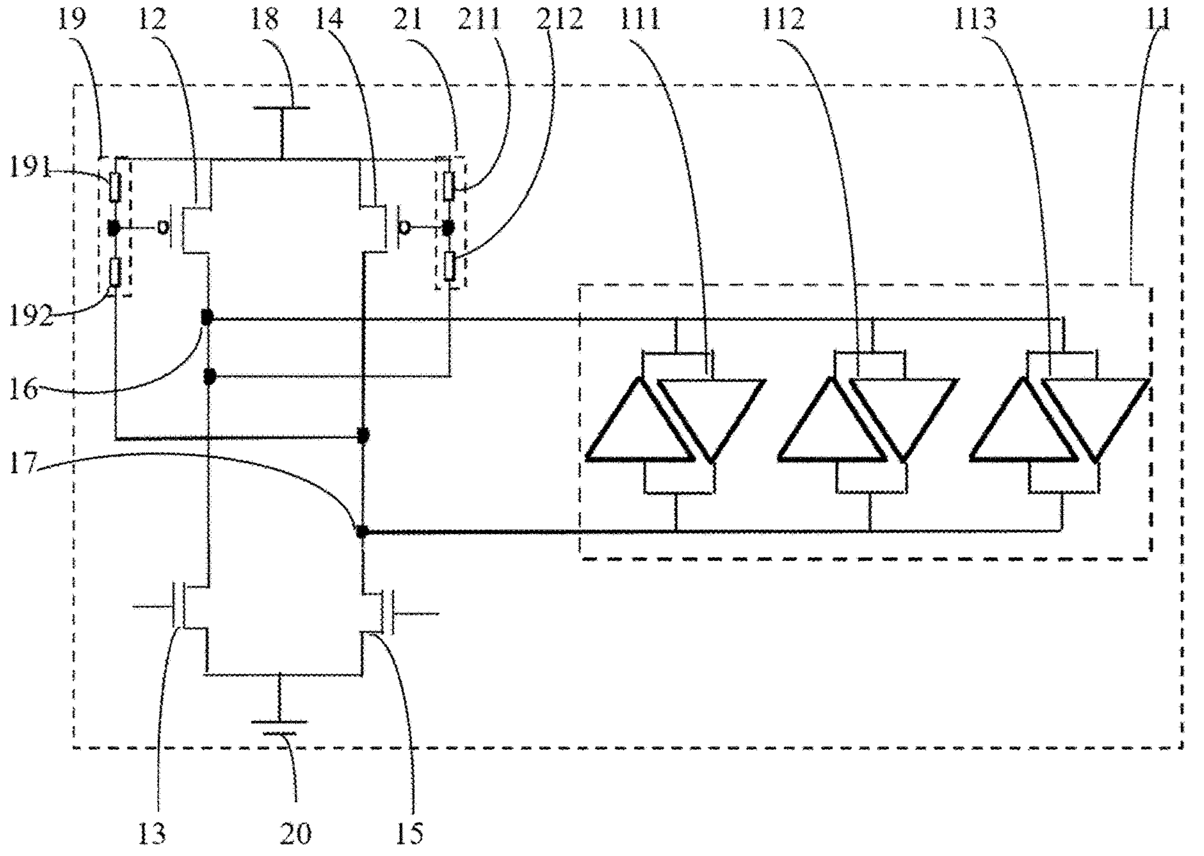
FIG. 1 illustrates a bidirectional colorful light triggered by power-line pulse signals connected in series and parallel.

As shown in FIG. 1, the bidirectional colorful light triggered by power-line pulse signals connected in series and parallel provided by the embodiment comprises a bidirectional luminous light string triggered by power-line pulse signals 11, a first controllable switch 12, a second controllable switch 13, a third controllable switch 14, and a fourth controllable switch 15.

The bidirectional luminous light string triggered by power-line pulse signals 11 consists of three bidirectional light sources 111, 112, and 113, which are connected in parallel to the first port 16 and the second port 17 of the bidirectional luminous light string triggered by power-line pulse signals.

The second controllable switch 13 and the fourth controllable switch 15 are controlled by a microcontroller.

The first controllable switch 12 is a PMOS, the second controllable switch 13 is an NMOS, the third controllable switch 14 is a PMOS, and the fourth controllable switch 15 is an NMOS.

The input of the first controllable switch 12 is connected to a DC power source 18, and the output is connected to the first port 16 of the bidirectional luminous light string triggered by power-line pulse signals 11. The control terminal of the first controllable switch 12 is connected to the output of the first voltage divider module 19, which comprises a first voltage divider resistor 191 (10K ohms) and a second voltage divider resistor 192 (10K ohms). One end of the first voltage divider resistor 191 is connected to the input of the first controllable switch 12, while the other end serves as the output of the first voltage divider module 19 and is connected to one end of the second voltage divider resistor 192. The other end of the second voltage divider resistor 192 is connected to the output of the fourth controllable switch 15.

The output of the second controllable switch 13 is connected to the first port 16 of the bidirectional luminous light string triggered by power-line pulse signals 11, the input is connected to ground 20, and the control terminal is connected to the control circuit (microcontroller).

The input of the third controllable switch 14 is connected to the DC power source 18, and the output is connected to the second port 17 of the bidirectional luminous light string triggered by power-line pulse signals 11. The control terminal of the third controllable switch 14 is connected to the output of the third voltage divider module 21, which comprises a third voltage divider resistor 211 (10K ohms) and a fourth voltage divider resistor 212 (10K ohms). One end of the third voltage divider resistor 211 is connected to the input of the third controllable switch 14, while the other end serves as the output of the third voltage divider module 21 and is connected to one end of the fourth voltage divider resistor 212. The other end of the fourth voltage divider resistor 212 is connected to the output of the second controllable switch 13.

The output of the fourth controllable switch 15 is connected to the second port 17 of the bidirectional luminous light string triggered by power-line pulse signals 11, the input is connected to ground 20, and the control terminal is connected to the control circuit (microcontroller).

In this embodiment, the second controllable switch 13 is turned off, and the third controllable switch 14 is controlled by the second controllable switch 13 to remain in the off state. The control circuit controls the on and off states of the fourth controllable switch 15 to control the light module triggered by power-line pulse signals in the bidirectional luminous light string triggered by power-line pulse signals 11. When the fourth controllable switch 15 is off, the first controllable switch 12 is controlled by the fourth controllable switch 15 to remain off, while the second controllable switch 13 is controlled by the control circuit to remain on, allowing the reverse light module of the bidirectional luminous light string triggered by power-line pulse signals 11 to operate.

Figure 2:
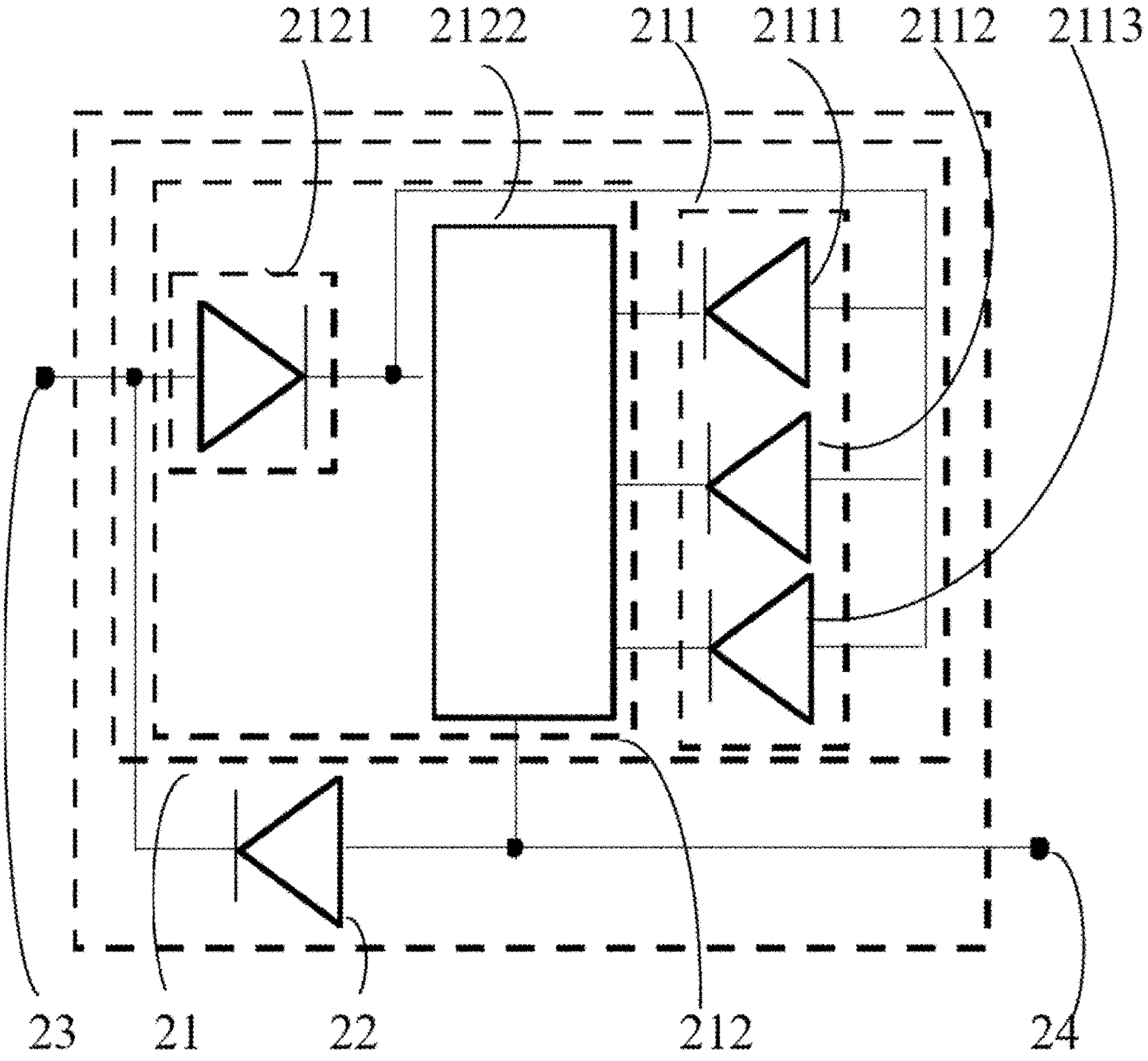
FIG. 2 illustrates a bidirectional light source.

In this embodiment, the bidirectional light sources 111, 112, and 113, as shown in FIG. 2, comprises:

A light module triggered by power-line pulse signals 21 and a reverse light module 22, which are connected in parallel between the first port 23 and the second port 24 of the bidirectional light source.

The light module triggered by power-line pulse signals 21 comprises an LED colorful light group 211 and an LED driver 212 that drives the LED colorful light group 211 based on the power-line pulse signals loaded on the power lines.

When the level at the first port 23 of the bidirectional light source is higher than that at the second port 24, the LED driver 212 drives the LED colorful light group 211 based on the power-line pulse signals from the power lines; when the level at the first port 23 is lower than that at the second port 24, the reverse light module 22 operates.

The LED driver 212 comprises: a reverse current blocking module 2121 and an operation module triggered by power-line pulse signals 2122.

The input of the reverse current blocking module 2121 is connected to the first port 23 of the bidirectional light source, and the output is connected to the operation module triggered by power-line pulse signals 2122, which drives the LED colorful light group 211 based on operation results.

In this embodiment, the LED colorful light group 211 is connected in a common anode configuration, consisting of a red LED 2111, a green LED 2112, and a blue LED 2113. The cathodes of the red LED 2111, green LED 2112, and blue LED 2113 are connected to the output of the operation module triggered by power-line pulse signals 2122, while the common anode is connected to the output of the reverse current blocking module 2121.

In this embodiment, the reverse current blocking module 2121 is a diode, with the anode connected to the first port 23 of the bidirectional light source and the cathode connected to the operation module triggered by power-line pulse signals 2122.

Figure 3:
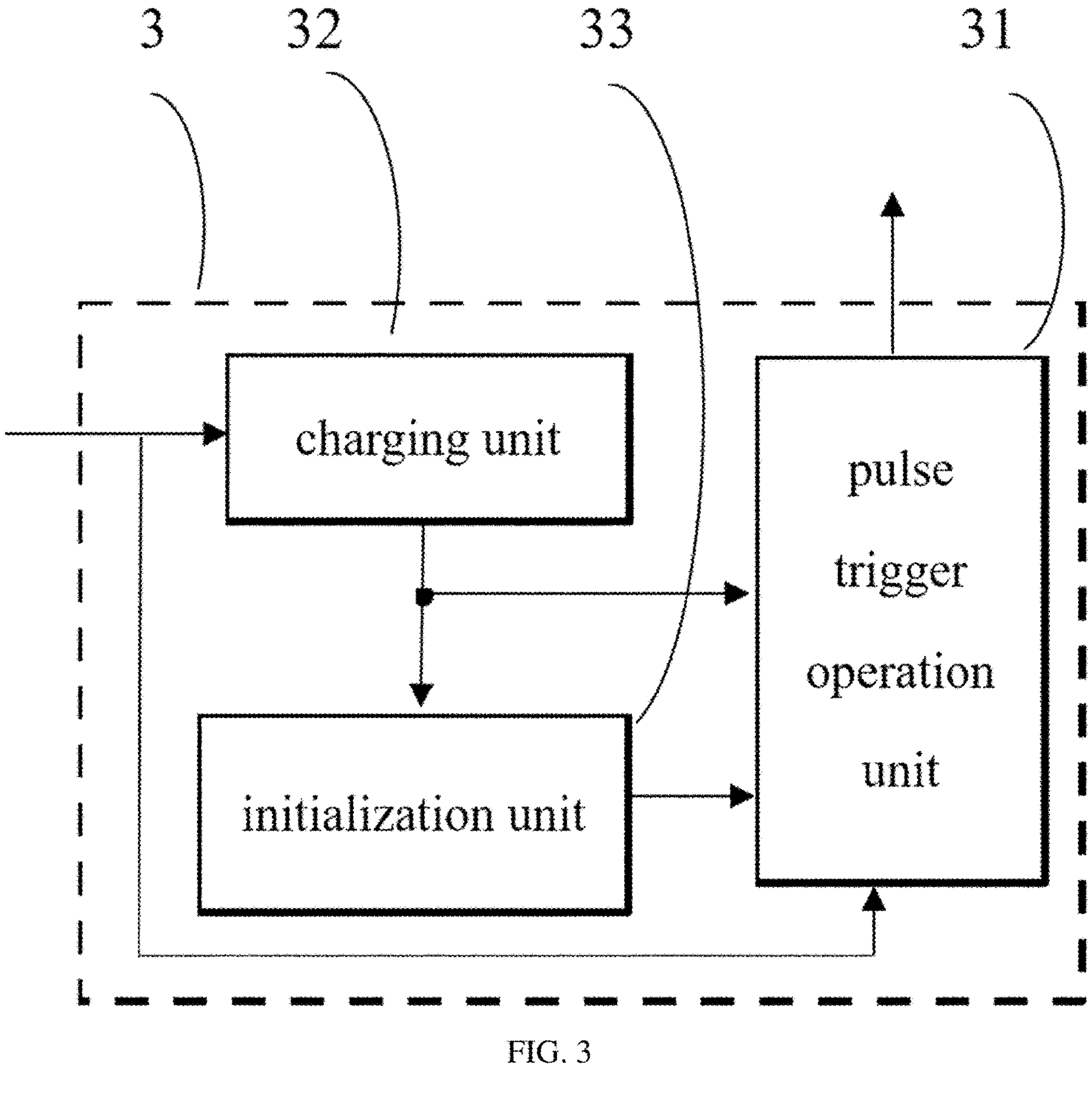
FIG. 3 illustrates an operation module triggered by power-line pulse signals.

In this embodiment, as shown in FIG. 3, the operation module triggered by power-line pulse signals 3 (2122) comprises: a pulse trigger operation unit 31, which performs operations based on the power-line pulse signals input from the power lines and outputs operation results; a charging unit 32, which provides power levels to the pulse trigger operation unit based on the pulse signals, with charging when the pulse signal is high and discharging when the pulse signal is low; and an initialization unit 33, which initializes the pulse trigger operation unit based on the power level.

The operation module triggered by power-line pulse signals 3 (2122) in this embodiment performs pulse counting operations triggered by the pulse signals, and drives the LED colorful light group 211 based on the operation results.

In this embodiment, the reverse current blocking module 2121 and the operation module triggered by power-line pulse signals 2122 are integrated into the same integrated circuit.

In this embodiment, the reverse light module 22 is a warm white LED, with the anode connected to the second port 24 of the bidirectional light source and the cathode connected to the first port 23 of the bidirectional light source.

The present invention achieves a bidirectional colorful light driven by power-line pulse signals by controlling the second and fourth controllable switches. Compared to some implementations, this invention simplifies the control circuit and obtains one spectral range through forward current triggered by power-line pulse signals. Additionally, it expands another spectral range through reverse current, significantly increasing the spectral range of the light source, light string, and their control devices using only two power lines.

The invention claimed is:

1. A bidirectional colorful light triggered by power-line pulse signals connected in series and parallel, comprises:

a bidirectional luminous light string triggered by power-line pulse signals, a first controllable switch, a second controllable switch, a third controllable switch, and a fourth controllable switch;

the bidirectional luminous light string triggered by power-line pulse signals comprises a plurality of bidirectional light sources, which are connected in parallel, or connected first in parallel and then in series, or connected first in series and then in parallel between the first port and the second port of the bidirectional luminous light string triggered by power-line pulse signals;

the bidirectional light source comprises a light module triggered by power-line pulse signals and a reverse light module, with the light module triggered by power-line pulse signals and the reverse light module connected in parallel at the first port and the second port of the bidirectional light source;

the light module triggered by power-line pulse signals comprises an LED colorful light group and an LED driver that drives the LED colorful light group based on power-line pulse signals loaded on power lines;

when the voltage level at the first port of the bidirectional luminous light string triggered by power-line pulse signals is higher than that at the second port, the voltage level at the first port of the bidirectional light source is also higher than that at the second port of the bidirectional light source, and the LED driver drives the LED colorful light group based on the power-line pulse signals loaded on the power lines; when the voltage level at the first port of the bidirectional luminous light string triggered by power-line pulse signals is lower than that at the second port, the voltage level at the first port of the bidirectional light source is lower than that at the second port of the bidirectional light source, and the reverse light module operates;

the second controllable switch and the fourth controllable switch are controlled by a control circuit;

the input terminal of the first controllable switch is connected to a DC power supply, the output terminal of the first controllable switch is connected to the first port of the bidirectional luminous light string triggered by power-line pulse signals, and the control terminal of the first controllable switch is connected to the output terminal of a first voltage divider module; the first voltage divider module comprises a first voltage divider resistor and a second voltage divider resistor, with one end of the first voltage divider resistor connected to the input terminal of the first controllable switch, the other end serving as the output of the first voltage divider module and connected to one end of the second voltage divider resistor, and the other end of the second voltage divider resistor connected to the output terminal of the fourth controllable switch;

the output terminal of the second controllable switch is connected to the first port of the bidirectional luminous light string triggered by power-line pulse signals, the input terminal of the second controllable switch is connected to ground, and the control terminal of the second controllable switch is connected to the control circuit;

the input terminal of the third controllable switch is connected to the DC power supply, the output terminal of the third controllable switch is connected to the second port of the bidirectional luminous light string triggered by power-line pulse signals, and the control terminal of the third controllable switch is connected to the output terminal of a third voltage divider module; the third voltage divider module comprises a third voltage divider resistor and a fourth voltage divider resistor, with one end of the third voltage divider resistor connected to the input terminal of the third controllable switch, the other end serving as the output of the third voltage divider module and connected to one end of the fourth voltage divider resistor, and the other end of the fourth voltage divider resistor connected to the output terminal of the second controllable switch;

the output terminal of the fourth controllable switch is connected to the second port of the bidirectional luminous light string triggered by power-line pulse signals, the input terminal of the fourth controllable switch is connected to ground, and the control terminal of the fourth controllable switch is connected to the control circuit.

2. The bidirectional colorful light of claim 1, wherein:

the first controllable switch is a first PMOS transistor, with the source of the first PMOS transistor serving as the input of the first controllable switch, the drain of the first PMOS transistor serving as the output of the first controllable switch, and the gate of the first PMOS transistor serving as the control terminal of the first controllable switch;

the third controllable switch is a third PMOS transistor, with the source of the third PMOS transistor serving as the input of the third controllable switch, the drain of the third PMOS transistor serving as the output of the third controllable switch, and the gate of the third PMOS transistor serving as the control terminal of the third controllable switch;

when the control circuit controls the fourth controllable switch to be off, the output level of the first voltage divider module equals the source level of the first PMOS transistor, causing the first PMOS transistor to turn off; when the control circuit controls the fourth controllable switch to be on, the output level of the first voltage divider module is less than the source level of the first PMOS transistor, causing the first PMOS transistor to turn on;

when the control circuit controls the second controllable switch to be off, the output level of the third voltage divider module equals the source level of the third PMOS transistor, causing the third PMOS transistor to turn off; when the control circuit controls the second controllable switch to be on, the output level of the third voltage divider module is less than the source level of the third PMOS transistor, causing the third PMOS transistor to turn on.

3. The bidirectional colorful light of claim 2, wherein:

when the control circuit sets the second controllable switch to off and the control circuit sets the fourth controllable switch to on, the LED driver drives the LED colorful light group based on the power-line pulse signals loaded on the power lines.

4. The bidirectional colorful light of claim 3, wherein:

when the control circuit sets the second controllable switch to off, while the control circuit switches the fourth controllable switch between on and off states, generating the power-line pulse signals loaded on the power lines, with the LED driver driving the LED colorful light group based on the power-line pulse signals loaded on the power lines.

5. The bidirectional colorful light of claim 4, wherein:

the LED driver comprises:

a reverse current blocking module, and an operation module triggered by power-line pulse signals;

the input end of the reverse current blocking module is connected to the first port of the bidirectional light source, and the output end of the reverse current blocking module is connected to the operation module triggered by power-line pulse signals, with the operation module triggered by power-line pulse signals driving the LED colorful light group based on operation results.

6. The bidirectional colorful light of claim 5, wherein:

the reverse current blocking module is a unidirectional conduction module, which conducts when the input end of the reverse current blocking module is at a higher voltage level than its output end, and turns off when the input end is at a lower voltage level than its output end.

7. The bidirectional colorful light of claim 6, wherein:

the unidirectional conduction module is a diode, with the anode of the diode connected to the first port of the bidirectional light source and the cathode connected to the operation module triggered by power-line pulse signals; or the unidirectional conduction module is an equivalent diode formed by an NPN transistor, with the collector and base of the NPN transistor connected together and then connected to the first port of the bidirectional light source, and the emitter connected to the operation module triggered by power-line pulse signals; or the unidirectional conduction module is an equivalent diode formed by a PNP transistor, with the collector and base of the PNP transistor connected together and connected to the operation module triggered by power-line pulse signals, and the emitter connected to the first port of the bidirectional light source.

8. The bidirectional colorful light of claim 7, wherein:

the reverse current blocking module and the operation module triggered by power-line pulse signals are integrated within a same integrated circuit.

9. The bidirectional colorful light of claim 8, wherein:

the low voltage level of the power-line pulse signals received by the bidirectional light source is the voltage level at the second port of the bidirectional light source.

10. The bidirectional colorful light of claim 8, wherein:

the low voltage level of the power-line pulse signals received by the bidirectional light source is a third voltage level that is higher than the voltage level at the second port of the bidirectional light source and lower than the voltage level at the first port of the bidirectional light source.

11. The bidirectional colorful light of claim 8, wherein:

the operation module triggered by power-line pulse signals of the bidirectional light source performs operations based on the pulse signals and drives the LED colorful light group based on the operation results.

12. The bidirectional colorful light of claim 11, wherein: the operations are arithmetic operations, logical operations, or a combination of arithmetic and logical operations.

13. The bidirectional colorful light of claim 8, wherein: the operation module triggered by power-line pulse signals of the bidirectional light source performs encoding and decoding operations triggered by the power-line pulse signals, with the high width of the power-line pulse signal and/or the low width of the power-line pulse signal corresponding to encoded information.

14. The bidirectional colorful light of claim 13, wherein: a given with of high level, or a given with of low level, or a combination of a given width of high levels and a given with of low level represent a given logical code.

15. The bidirectional colorful light of claim 8, wherein: the operation module triggered by power-line pulse signals of the bidirectional light source performs modulation and demodulation operations based on current or voltage frequency triggered by the power-line pulse signals, and drives the LED colorful light group based on the results of the modulation and demodulation operations.

16. The bidirectional colorful light of claim 1, wherein: the reverse light module is composed of a plurality of LEDs.

* * * * *